United States Patent
Bruso

[19]

[11] Patent Number: 5,809,779
[45] Date of Patent: Sep. 22, 1998

[54] AUXILIARY HYDRAULIC POWER UNIT

[76] Inventor: Bruce L. Bruso, R.R.1 Box 1T, E. Mountain Rd., Hegins, Pa. 17938

[21] Appl. No.: 664,903

[22] Filed: Jun. 17, 1996

[51] Int. Cl.[6] .................................................. F16D 31/02
[52] U.S. Cl. ............................... 60/458; 60/325; 60/486; 60/916; 405/128; 405/258; 405/267
[58] Field of Search ............................ 60/325, 458, 486, 60/916; 37/375, 376, 403, 404, 902; 180/69.6; 405/128, 258, 267

[56] References Cited

U.S. PATENT DOCUMENTS

| | | | |
|---|---|---|---|
| 2,959,923 | 11/1960 | Shook | 60/424 |
| 4,776,409 | 10/1988 | Manchak | 405/128 |
| 5,540,006 | 7/1996 | Lloyd | 37/403 |

FOREIGN PATENT DOCUMENTS 2191979  12/1987  United Kingdom .................. 180/69.6

WO9425191  11/1994  WIPO .

OTHER PUBLICATIONS

Multi–purpose Gradall, publication of Warner & Swasey Co., May 1955.
John Deere Model 690 E Product Literature, dated Dec. 1991.
John Brown & Sons, Weare, N.H., drawing of a "Power Plant Compartment Assembly", date unknown, sometime prior to Jun., 1996.

Primary Examiner—F. Daniel Lopez
Attorney, Agent, or Firm—Seidel, Gonda, Lavorgna & Monaco, PC

[57] ABSTRACT

The present invention relates generally to a hydraulic power unit for supplying hydraulic fluid under pressure to industrial equipment, and more particularly to an auxiliary hydraulic power unit that is adapted to mount to a vehicle and supply auxiliary hydraulic power to auxiliary equipment associated with the vehicle during operation in the field.

8 Claims, 11 Drawing Sheets

| FIG. 5 | |
|---|---|
| FIG. 5A | FIG. 5C |
| FIG. 5B | FIG. 5D |

AUXILIARY HYDRAULIC POWER UNIT

FIELD OF THE INVENTION

The present invention relates generally to an auxiliary hydraulic power unit for supplying hydraulic fluid under pressure to industrial equipment, and more particularly to an auxiliary hydraulic power unit that is adapted to mount to a vehicle and supply auxiliary hydraulic power to auxiliary equipment associated with the vehicle and to ancillary appliances during operation in the field.

BACKGROUND OF THE INVENTION

Generally, track vehicles used as earth movers are equipped with an on-board hydraulic power system capable of producing hydraulic power for the tracks and an articulating arm or tool lifter. In addition, the on-board hydraulic system can provide a limited amount of additional hydraulic power to auxiliary devices, usually by means of a single hydraulic tap for one tool.

As the power requirement or number of auxiliary hydraulic devices are increased, the demand for hydraulic power can quickly overcome the capability of the on-board system. When this occurs the performance of the vehicle or of the equipment will degrade and can even become inoperable or dangerous. In the past, attempts have been made to modify these on-board hydraulic systems with demand dependant priority valves. However, these attempts have been of limited success when more than one device demands hydraulic power at the same time.

The present invention address this need for auxiliary power by providing an independent auxiliary hydraulic power unit that attaches onto the vehicle. This power unit can provide control and auxiliary hydraulic power for multiple auxiliary devices as well as multiple ancillary devices incorporated into the power unit. The auxiliary power unit is most needed when the vehicle is equipped with high demande devices such as a soil remediation system.

SUMMARY OF THE INVENTION

The present invention relates to an auxiliary hydraulic power unit. The power unit is adapted for mounting onto a vehicle, and for supplying auxiliary hydraulic power to hydraulically-powered equipment associated with the vehicle and to ancillary hydraulically-powered appliances.

The power unit has a frame that is adapted to mount to the rear end of the vehicle and to support a combustion engine and a hydraulic pump powered by the combustion engine. A hydraulic reservoir is also supported by the frame, and stores and supplies hydraulic fluid to the hydraulic pump.

The power unit further includes an ancillary equipment platform also supported by the frame. The platform is used to mount ancillary hydraulically powered appliances and related attachments including, but not limited to: fluid pumps, air blowers, fluid storage containers, and air treatment canisters.

The power unit further includes a hydraulic distribution system which directs the hydraulic power to the ancillary appliances of the power unit and to the auxiliary equipment associated with the vehicle. The distribution system may be separate from or incorporated with the hydraulic pump.

The power unit further includes a control console and related circuitry adapted for mounting on the vehicle in proximity to its operator. The control console is used to control and operate the ancillary appliances of the power unit and the auxiliary equipment associated with the vehicle.

In a preferred embodiment of the invention, the power unit is mounted to a track drive excavator, specifically a Model 690E excavator manufactured by John Deere. The excavator has a hydraulically-powered articulated boom to which is mounted the auxiliary hydraulic powered equipment associated with the vehicle, such as a trenching, drilling, or shearing tool.

The auxiliary hydraulic power unit's frame is mounted to the rear of the excavator and attached by a bolt hole pattern and bolts provided with the excavator to retain a counterweight. The frame can be attached to the rear of the excavator behind the counterweight or with the counterweight removed. The frame attaches to the excavator by a sub-frame incorporated into the frame and adapted to the bolts and bolt hole pattern of the vehicle and counterweights. Although the depicted preferred embodiment is to be attached to a 690E John Deere excavator, the sub-frame's bolt hole pattern may be adapted for attachment to other vehicles.

In the depicted embodiment, the auxiliary hydraulic powered equipment is the trenching tool of a soil remediation apparatus for treating contaminated soil. The trenching tool penetrates the ground and churns the soil in situ with a plurality of chain driven carbide-tipped teeth, while a remediation fluid is discharged into the soil as it is churned and crushed by the tool. The remediation fluid includes, but is not limited to, decontamination fluids or heated air.

A remediation fluid injection apparatus is mounted to the vehicle to inject a remediation fluid in close proximity to the trenching tool. The injection apparatus includes a plurality of injectors positioned along the length of the trenching tool. The injectors are supplied with remediation fluid through tubing supported by the vehicle and connected to a remediation fluid delivery system.

The remediation fluid delivery system in the depicted embodiment is an ancillary hydraulically powered appliance mounted on the power unit. The delivery system includes a hydraulically driven hydrostatic pump and liquid storage tank to store the decontamination fluids. The pump is provided to move the fluids through the tubing to the injectors. Heated air can be provided to the injectors. The source of the heated air is the exhaust produced by the combustion engine of the power unit or the vehicle or both, supplied through insulated heat resistant tubing to the injectors.

The soil remediation equipment also includes a vapor emission recovery hood mounted to the boom of the excavator over the trenching tool and used to recover vapor emissions from volatile material in the soil or in the remediation fluid which are released during the operation. Consequently, the ancillary appliances of the power unit further include a vapor emission recovery system for removing and treating the vapor emissions captured by the hood. The emission recovery system includes a hydraulically powered blower to provide vacuum and compressed air, and an activated carbon filter and condenser unit. The vacuum is applied to the hood through tubing supported by the vehicle and the power unit. The vapor emissions are removed from the hood by the vacuum and transported through the tubing into the carbon filter and condenser unit. The compressed air provided by the blower can also be connected to the injection delivery system to supply ambient air to treat the contaminated material.

This in-situ soil remediation treatment apparatus and procedure is further explained in U.S. patent application Ser. No. 8,287,275, and related applications, which are incorporated herein by reference.

BRIEF DESCRIPTION OF THE DRAWINGS

In these drawings, like numerals identify like elements.

DETAILED DESCRIPTION OF THE INVENTION

Figure 1:
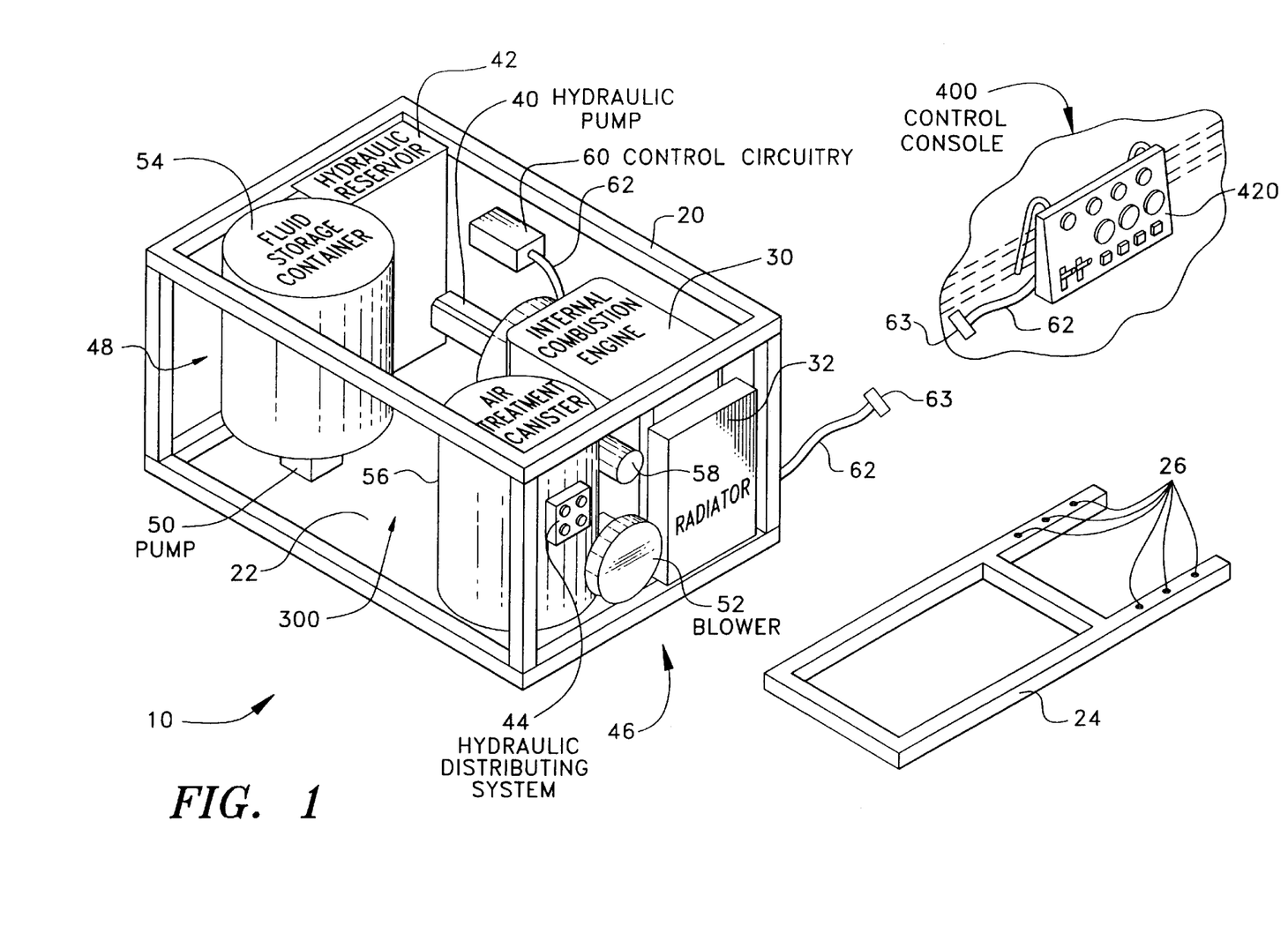
FIG. 1 is an illustration of a power unit as contemplated by the present invention.

FIG. 1 shows an auxiliary hydraulic power unit which is generally referred to by the numeral 10. The power unit 10 is adapted for mounting onto a vehicle 100 (shown in FIG. 3), and supplies auxiliary hydraulic power to hydraulically powered equipment associated with the vehicle 200 (shown in FIGS. 2a and 2b) and to hydraulically powered ancillary equipment as described below.

The power unit 10 has a frame 20 that is adapted to mount to an end of the vehicle 100 by means of a sub-frame 24. The frame 20 is adapted to support a combustion engine 30 and a hydraulic pump 40 powered by the engine. The combustion engine 30 is cooled by a radiator 32. The power unit further includes a hydraulic reservoir 42 supported by the frame 20. The reservoir 42 stores and supplies hydraulic fluid to the hydraulic pump 40.

The power unit 10 further includes an ancillary equipment platform 22 supported by the frame 20. The platform 22 is used to secure the ancillary hydraulically powered appliances and related attachments including, but not limited to: pumps 50, blowers 52, fluid storage containers 54, and air treatment canisters 56.

The power unit 10 further includes a hydraulic distribution system 44 supported by frame 10. The hydraulic distribution system 44 directs the hydraulic power to the ancillary appliances on the power unit 10 and to the auxiliary equipment 200 associated with the vehicle 100. It is understood that the distribution system 44 may be separate from hydraulic pump 40 (as shown) or incorporated with the hydraulic pump (not shown).

The power unit 10 further includes a control console 400 having a control panel 420 and related electrical and sensor components which is adapted for mounting on the vehicle 100 in proximity to its operator. The control console 400 is used to control and operate the ancillary appliances and the auxiliary equipment associated with the vehicle.

The control console 400 is connected to control circuitry 60 and attached to the frame 20 on the power unit 10. The control circuitry 60 can be incorporated in the power unit 10 (as shown) or mounted on the vehicle (not shown). The control console 400 is interconnected to the engine 30, pump 40, hydraulic distribution system 44, and any ancillary appliances by a wiring harness 62.

Figure 2A:
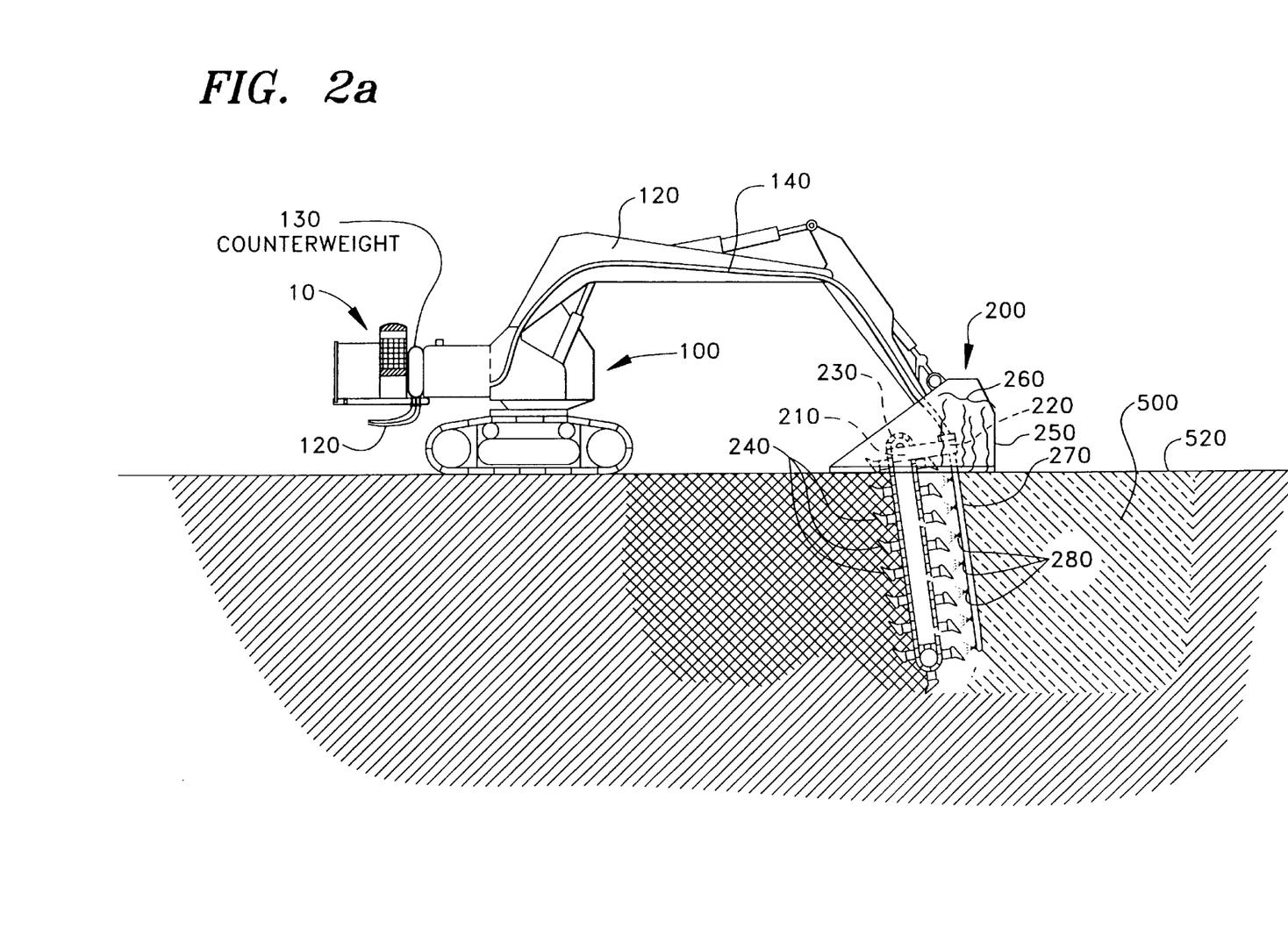
FIG. 2a is an illustration of an auxiliary hydraulic power unit as contemplated by the present invention shown attached to a vehicle which is equipped with a counterweight.
Figure 2B:
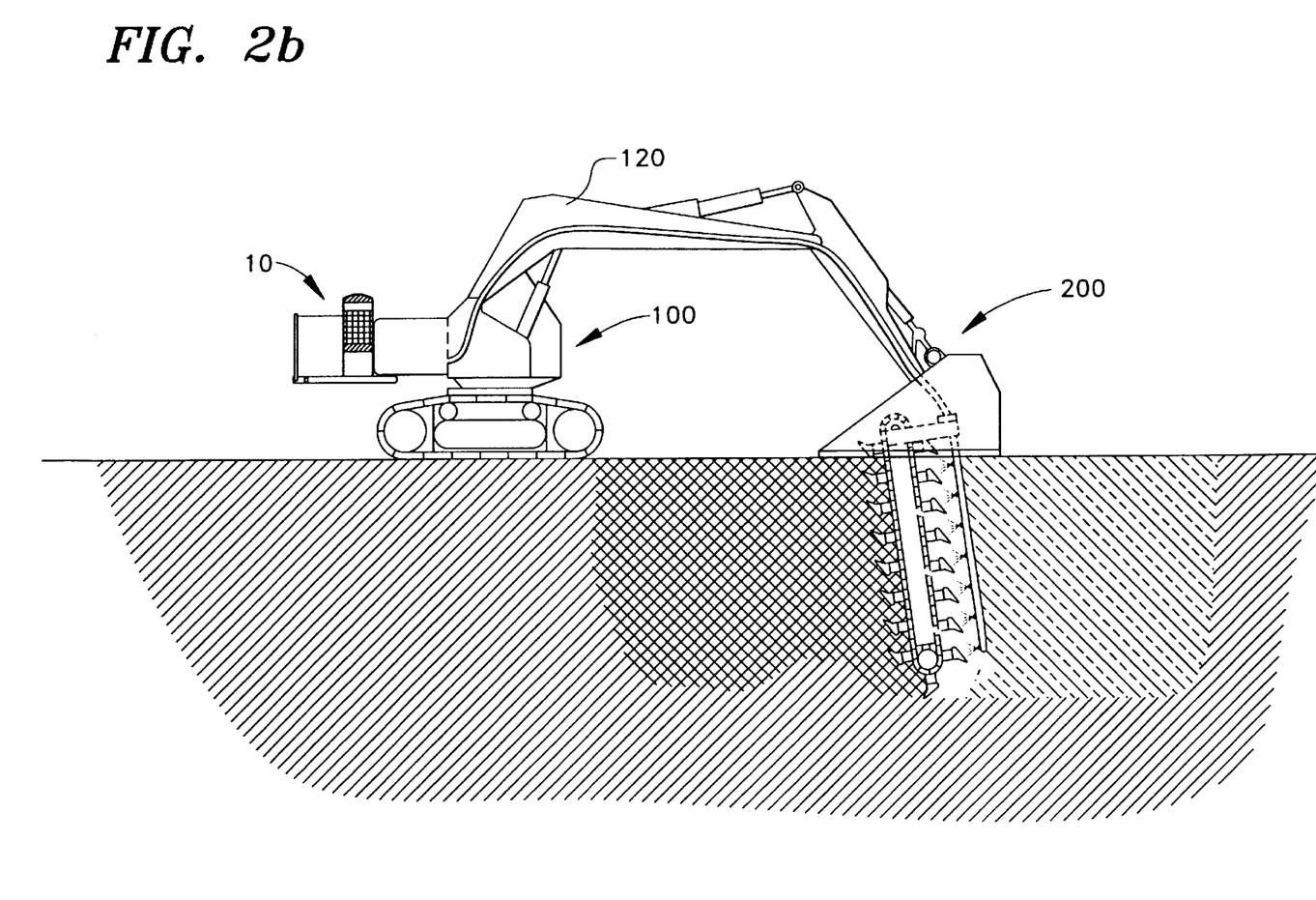
FIG. 2b is an illustration of an auxiliary hydraulic power unit as contemplated by the present invention shown attached to a vehicle which is not equipped with a counterweight.

Referring to FIGS. 2a and 2b, there is illustrated a preferred embodiment of the invention. The power unit 10 is mounted to a track drive excavator 100 like a Model 690E excavator manufactured by John Deere. The excavator has a hydraulically powered articulated boom 120 to which the auxiliary hydraulic powered equipment 200 is mounted.

The auxiliary hydraulic power unit 10 is mounted to the rear of the excavator 100 and attached by a bolt hole pattern 26 (shown in FIG. 1) and bolts 120 provided with the excavator 100 to retain a counterweight 130. The power unit 10 can be attached to the rear of the excavator 100 with or without a counterweight 130 attached (shown in FIG. 2b and FIG. 2a respectively).

Figure 3:
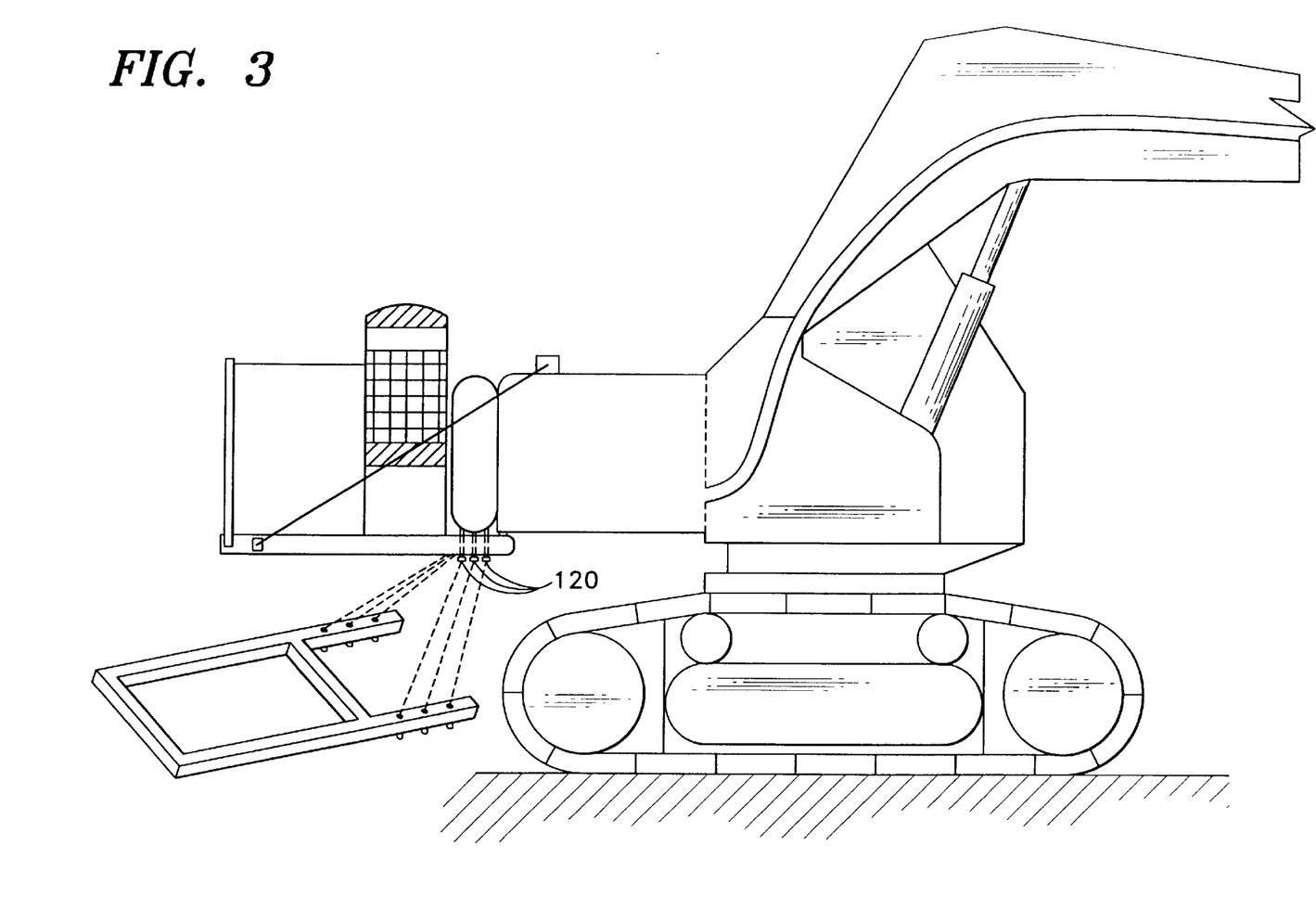
FIG. 3 is an illustration of a power unit as contemplated by the present invention attached and fastened by bolts to a vehicle by a sub-frame and supported by a support member.

Referring to FIG. 3, the power unit 10 is attached to the excavator 100 by the sub-frame 24, which is adapted to the bolts 120 and bolt hole pattern 26. The sub-frame 24 is incorporated into the frame of the power unit. Although in the preferred embodiment of the present invention the power unit 10 is preferably attached to a John Deere 690E excavator, the sub-frame 24 and the frame 20 may be adapted for attachment to other vehicles (not shown).

Figure 4:
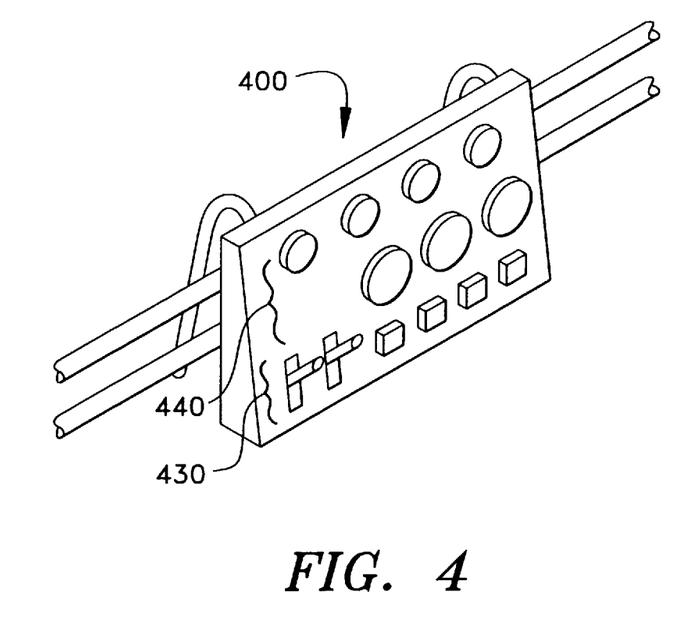
FIG. 4 is an illustration of a control console as contemplated by the present invention.
Figure 5A:
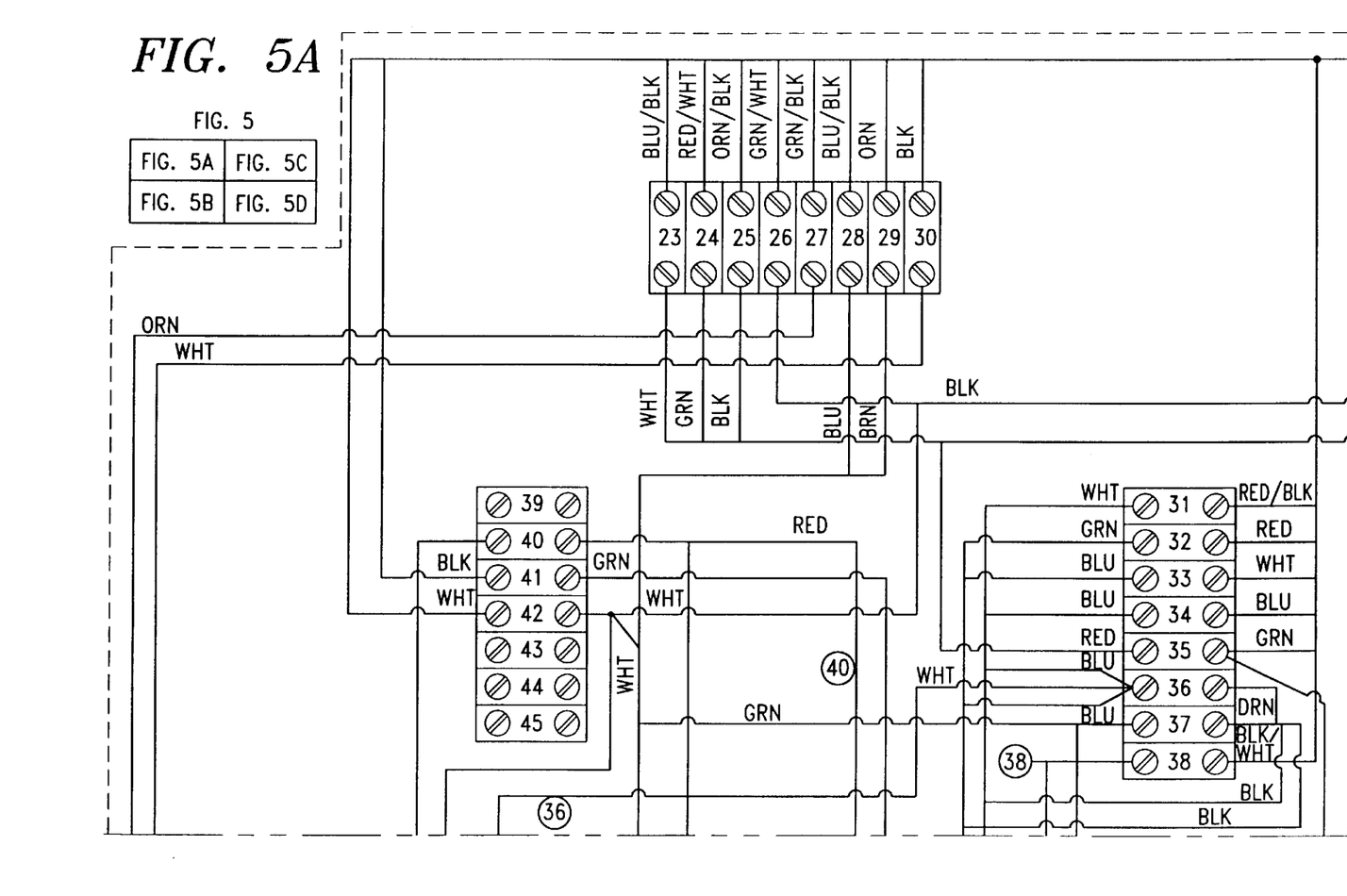
FIG. 5 is an illustration of an electrical schematic of the control console and related circuitry unit illustrated in FIG. 4.
Figure 5B:
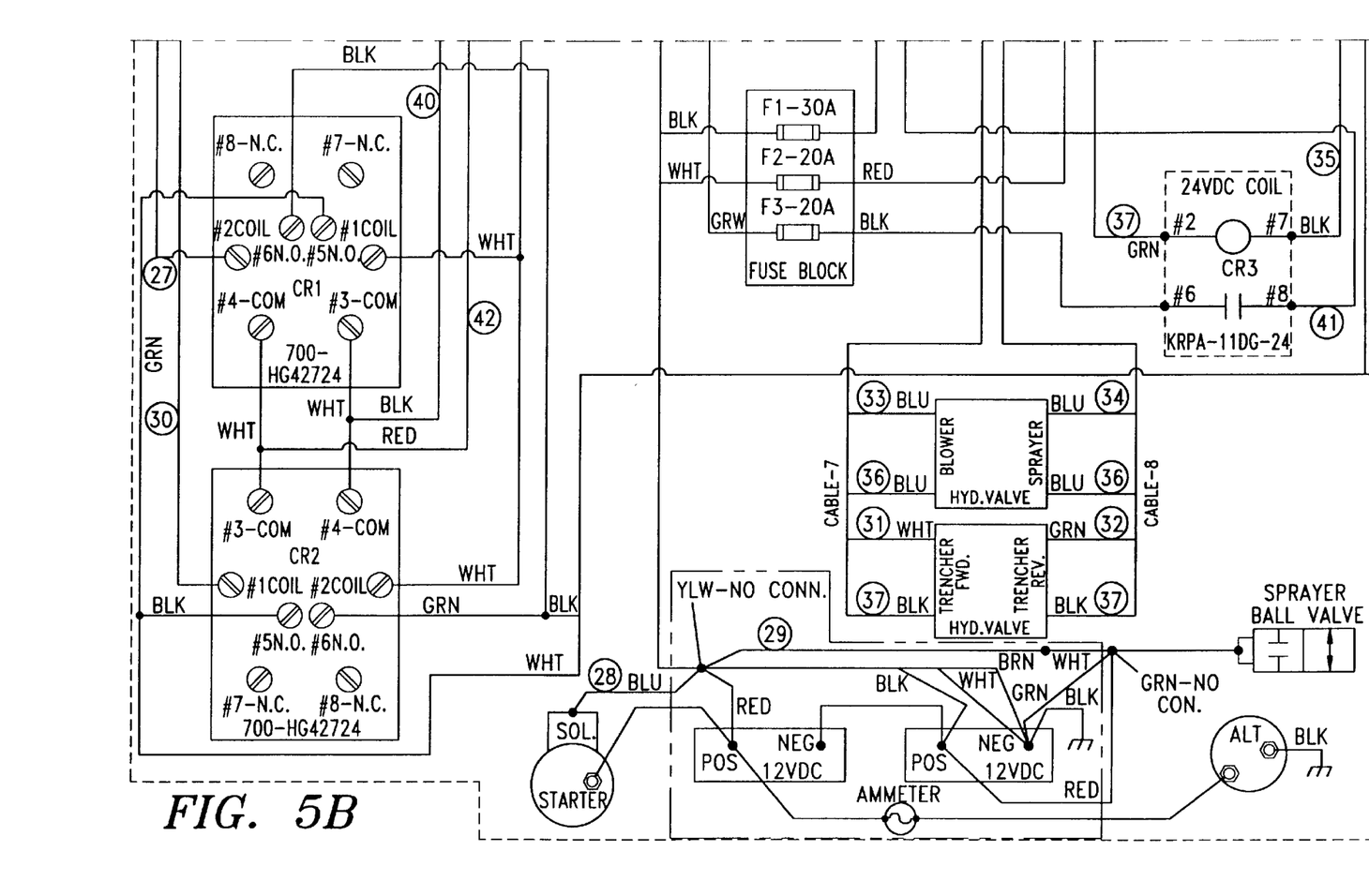
Figure 5C:
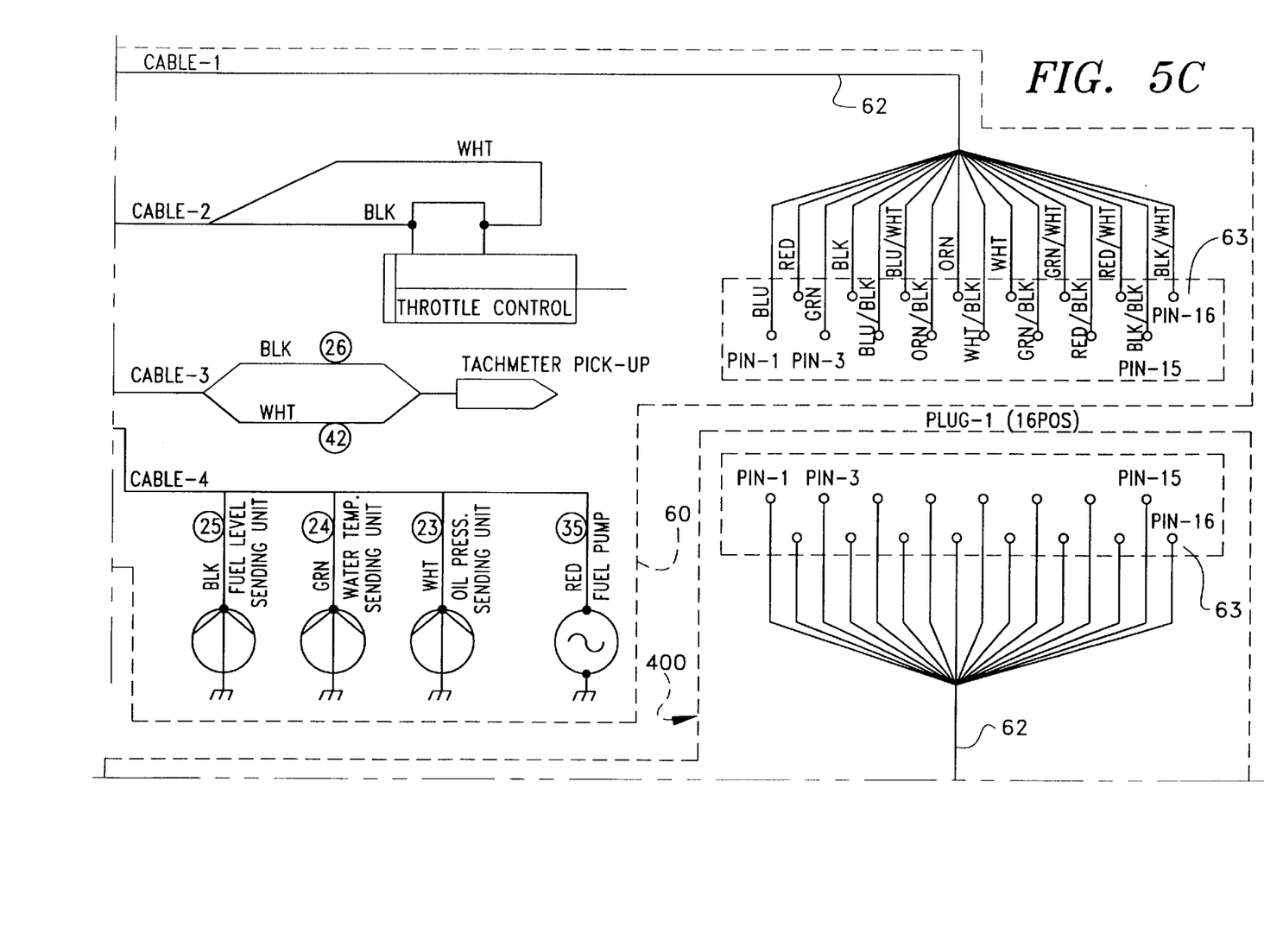
Figure 5D:
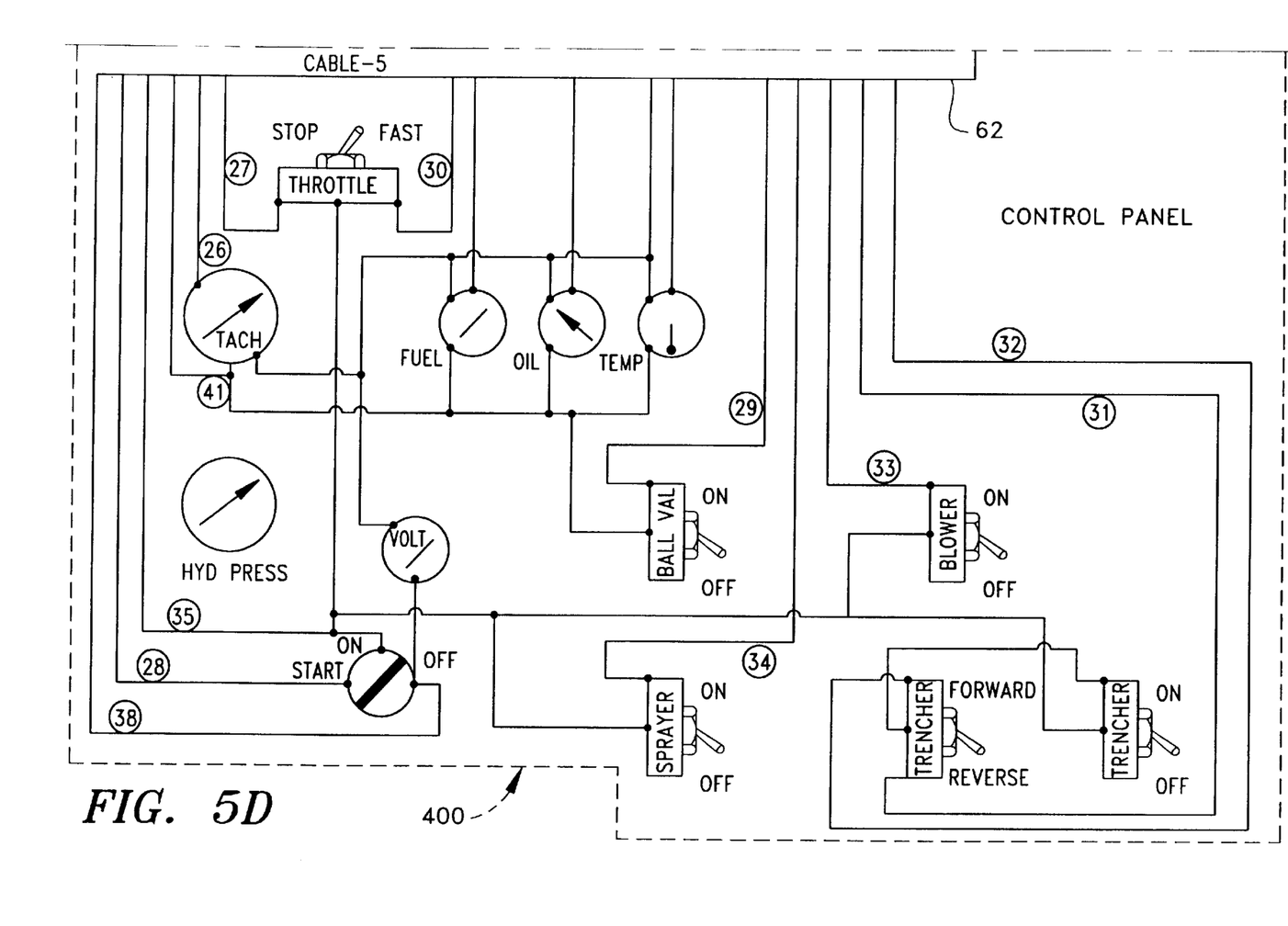

Referring to FIG. 4, the control console 400 includes controls 430 (shown as an illustration only) that include electric and mechanical switches and levers for controlling the operation of the power unit, the ancillary appliances, and the auxiliary equipment. The control panel 420 displays mechanical and electric indicating instruments 440 including: hydraulic pressure gauges, temperature, current, voltage, and engine speed indicators. FIG. 5 illustrates a preferred embodiment of the control circuitry 60 that is associated with the control console 400. The console 400 is interconnected to the circuitry 60 by means of a wiring harness 62 and associated connectors 63.

Referring to FIGS. 2a and 2b, the hydraulic powered auxiliary equipment 200 in the depicted embodiment is a soil remediation apparatus. The apparatus 200 is provided for treating contaminated material 500, such as contaminated soil. The apparatus 200 includes a hydraulically powered trenching tool 220 for trenching soil in place. The trenching tool 220 penetrates the surface 520 of the material and churns the soil with a plurality of chain driven 230 carbide tipped teeth 240. This procedure is further explained by U.S. patent application Ser. No. 8,287,275, and related applications, which are incorporated herein by reference.

The auxiliary hydraulically powered equipment 200 further includes a vapor emission recovery hood 250 which is also mounted to the boom 120 of the excavator 100. The hood is used to recover vapor emissions 260 produced during the operation of the trenching tool 220.

A remediation fluid injection apparatus 270 is mounted to the trenching tool 220. The injection apparatus 270 is used to inject a remediation fluid in close proximity to the trenching tool 220. The injection apparatus 270 includes a plurality of injectors 280 positioned along the length of the trenching tool 220. The injectors 280 are supplied with remediation fluid by supply tubing 140 supported by the vehicle 110 and connected to one of the ancillary appliances, the remediation fluid delivery system 48. The remediation fluid includes but is not limited to the use of liquids or gases such as decontamination fluids or heated air. The remediation fluid delivery system 48 conveys and delivers the remediation fluid to the injection apparatus 270.

The delivery system 48 includes a hydraulically driven hydrostatic pump 50 and liquid storage tank 54. The tank 54 is provided for storing the remediation fluids or gases, and the pump 50 is provided to transport the fluids through tubing 140 connected to the injection apparatus 270.

In addition, the ancillary appliances further includes a vapor emission recovery system 46 for removing and treating the vapor emissions 260 captured by the hood 250. The emission recovery system 46 includes a blower 52 to provide vacuum and compressed air, and an activated carbon and condenser unit 56. The vacuum is applied to the hood through tubing (not shown) supported by the vehicle 100 and the power unit 10. The vapor emissions 260 are removed from the hood 250 by vacuum and are transported through the tubing (not shown) into the carbon and condenser unit 56 where it is treated.

Figure 6:
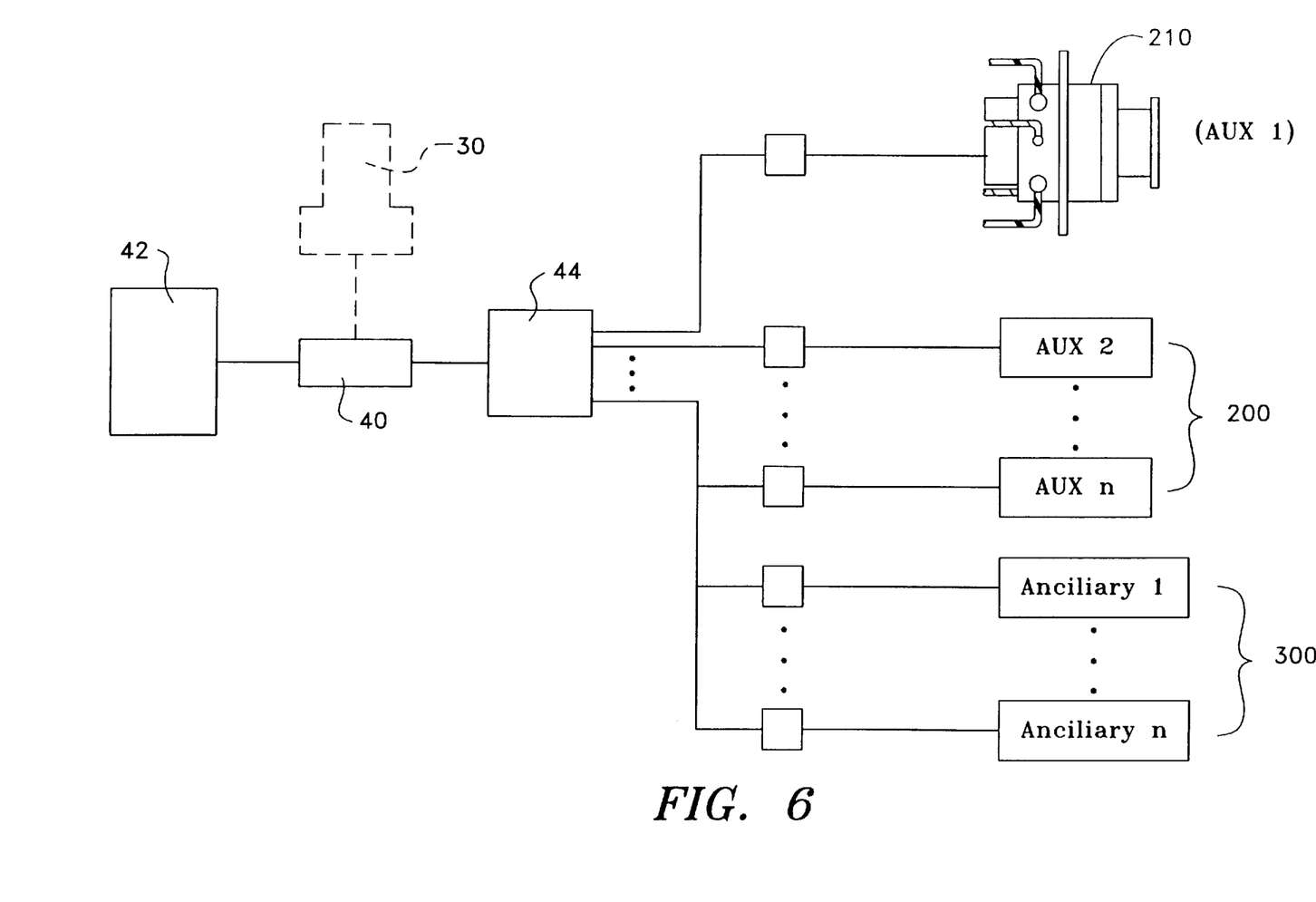
FIG. 6 is an illustration of a hydraulic distribution system of the power unit.

FIG. 6 shows is an illustration of a hydraulic schematic. The system includes the reservoir 42, pump 40 driven by engine 30, and distribution system 44. In a preferred embodiment of the invention, the auxiliary equipment 200 and the ancillary appliances 300 are connected to the distribution system 44. As an example, a hydraulic motor 210 of the trenching device 200 is shown connected to the distribution system 44.

Figure 7:
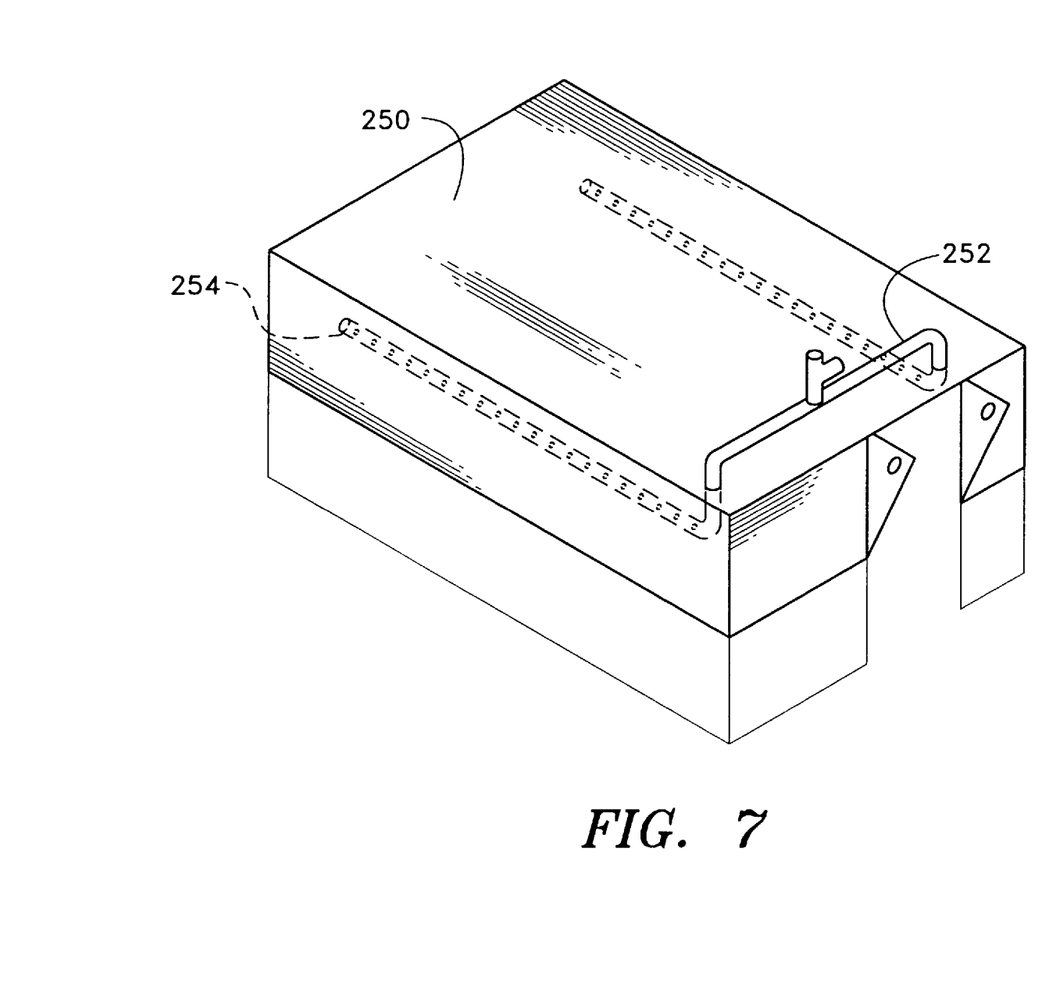
FIG. 7 is an illustration of a vapor recovery hood of a soil remediation apparatus using a power unit of the present invention.

In a preferred embodiment of the invention, FIG. 7 shows an illustration of preferred embodiment of a vapor recovery hood 250 having a vacuum recovery manifold 252 and tubing 254 to recover the vapor emissions.

Compressed air may be provided by the blower 52 through the tubing 140 which is also connected to the injection delivery system 48 to supply ambient air to treat the contaminated material. Heated air may provided by the auxiliary appliances through insulated heat resistant tubing (not shown) for treating the contaminated material. The source of the heated air is the exhaust produced by the combustion engine 30 of the power unit 10 or the vehicle (not shown) or both.

The present invention may be embodied in other specific forms without departing from the spirit or essential attributes thereof and, accordingly, reference should be made to the appended claims, rather than to the foregoing specification, as indicating the scope of the invention.

What is claimed is:

1. An auxiliary hydraulic power unit, which is attachable to a vehicle, for supplying auxiliary hydraulic power to auxiliary hydraulic powered equipment, which equipment is attachable to a boom of the vehicle, said auxiliary hydraulic power unit comprising:

a frame for mounting to said vehicle, a combustion engine supported by said frame, a hydraulic pump supported by the frame and powered by said combustion engine, said hydraulic pump supplying hydraulic power to said auxiliary equipment, a hydraulic reservoir supported by said frame, said reservoir storing and supplying hydraulic fluid to said hydraulic pump, an ancillary platform supported by said frame for securing ancillary hydraulic powered appliances, a hydraulic distribution system supported by said frame for directing hydraulic power to said ancillary appliances and said auxiliary equipment, and a control console for mounting on said vehicle in proximity to its operator for controlling and operating said auxiliary hydraulic power unit and said auxiliary hydraulic powered equipment.

2. The auxiliary hydraulic power unit according to claim 1, wherein said auxiliary hydraulic power equipment includes a soil remediation apparatus comprising:

a trenching tool for trenching soil in place, a vapor emission recovery hood for recovering vapor emissions produced during the operation of said trenching tool, and a remediation treatment injection apparatus mounted to said trenching tool, for injecting a remediation treatment in close proximity to the trenching tool, and wherein said auxiliary hydraulic power is supplied to said ancillary appliances which comprise a remediation treatment delivery system for conveying and delivering said remediation treatment to said injection apparatus, and a vapor emission recovery system for removing and treating said vapor emissions from said hood.

3. An auxiliary hydraulic power unit mounted to a track drive excavator having a hydraulically powered articulating boom, said auxiliary hydraulic power unit to supply auxiliary hydraulic power to auxiliary hydraulic powered equipment that is mounted to said boom, said auxiliary hydraulic power unit comprising:

a frame mounted to one end of said track drive excavator, a combustion engine supported by said frame, a hydraulic pump supported by said frame and powered by said combustion engine, said hydraulic pump supplying auxiliary hydraulic power to said auxiliary equipment, a hydraulic reservoir supported by said frame, said reservoir storing and supplying hydraulic fluid to said hydraulic pump, an ancillary platform supported by said frame for securing ancillary hydraulic powered appliances, a hydraulic distribution system supported by said frame for directing auxiliary hydraulic power to said ancillary appliances and said auxiliary equipment, and a control console adapted for mounting on said track drive excavator in proximity to its operator for controlling and operating said auxiliary hydraulic power unit and said auxiliary hydraulic powered equipment.

4. The auxiliary hydraulic power unit according to claim 3, wherein said auxiliary hydraulic powered equipment is a soil remediation apparatus for treating contaminated soil comprising:

a trenching tool for trenching soil in place, a vapor emission recovery hood for recovering vapor emissions produced during the operation of said trenching tool, and a remediation treatment injection apparatus mounted to said trenching tool, for injecting a remediation treatment in close proximity to the trenching tool, and wherein said ancillary appliances comprise a remediation treatment delivery system for conveying and delivering said remediation treatment to said injection apparatus, and a vapor emission recovery system for removing and treating said vapor emissions from said hood.

5. A hydraulic power system including an auxiliary hydraulic power unit, which is attachable to a vehicle, and auxiliary hydraulic power equipment, which equipment is attachable to a boom of the vehicle, said hydraulic power system comprising:

a frame supporting a combustion engine, a hydraulic pump, and a hydraulic reservoir, wherein said combustion engine drives said hydraulic pump that is supplied with hydraulic fluid from said hydraulic reservoir, wherein said hydraulic pump provides auxiliary hydraulic power to said auxiliary hydraulic power equipment.

6. An auxiliary hydraulic power unit according to claim 5, wherein said auxiliary hydraulic power equipment includes a trenching tool.

7. An auxiliary hydraulic power unit according to claim 5, wherein said auxiliary hydraulic power equipment includes a vapor recovery system.

8. An auxiliary hydraulic power unit according to claim 5, wherein said auxiliary hydraulic power equipment includes a remediation treatment injection apparatus.

* * * * *